United States Patent [19]

Adams

[11] Patent Number: 4,969,263

[45] Date of Patent: Nov. 13, 1990

[54] METHOD OF MAKING A CAST ENGINE CYLINDER HAVING AN INTERNAL PASSAGEWAY

[75] Inventor: Gar M. Adams, Elkhart Lake, Wis.

[73] Assignee: Tecumseh Products Company, Tecumseh, Mich.

[21] Appl. No.: 442,132

[22] Filed: Nov. 28, 1989

Related U.S. Application Data

[62] Division of Ser. No. 339,644, Apr. 18, 1989, Pat. No. 4,922,863.

[51] Int. Cl.[5] .................... B23P 15/00

[52] U.S. Cl. .................... 29/888.06; 29/527.6; 29/888.061; 164/98

[58] Field of Search .................... 29/888.06, 888.061, 29/527.6; 164/76.1, 98; 123/52 MC, 52 M, 193 C, 668

[56] References Cited

U.S. PATENT DOCUMENTS

| | | | |
|---|---|---|---|
| 1,037,859 | 9/1912 | Burk . | |
| 3,382,857 | 5/1968 | Foster et al. | 123/193 |
| 4,003,422 | 1/1977 | Schramm et al. | 164/9 |
| 4,077,458 | 3/1978 | Hayashi et al. | 164/11 |
| 4,148,352 | 4/1979 | Sensui et al. | 164/112 |
| 4,157,607 | 6/1979 | Ernest | 29/888.06 |
| 4,252,175 | 2/1981 | Whipple | 164/9 |
| 4,276,994 | 7/1981 | Spalding | 164/98 |
| 4,368,698 | 1/1983 | Matsuo et al. | 123/52 |
| 4,548,167 | 10/1985 | Tamba et al. | 123/41.56 |
| 4,637,110 | 1/1987 | Yamagata | 29/888.061 |
| 4,643,138 | 2/1987 | Ruf et al. | 123/52 |
| 4,676,064 | 6/1987 | Narita et al. | 60/272 |
| 4,700,444 | 10/1987 | Yamagata | 164/98 |
| 4,715,178 | 12/1987 | Tsukuda et al. | 164/98 |
| 4,789,004 | 12/1988 | McCracken | 137/827 |
| 4,819,589 | 4/1989 | Nagashima | 123/52 |
| 4,858,670 | 8/1989 | Field et al. | 164/98 |

FOREIGN PATENT DOCUMENTS

| | | | |
|---|---|---|---|
| 0040663 | 3/1985 | Japan | 164/98 |
| 640440 | 1/1984 | Switzerland . | |
| 2052329 | 1/1981 | United Kingdom . | |

*Primary Examiner*—Howard N. Goldberg
*Assistant Examiner*—Irene Cuda
*Attorney, Agent, or Firm*—Jeffers, Hoffman & Niewyk

[57] ABSTRACT

A cast cylinder for an internal combustion engine having an intake valve cavity located on one side of the piston bore, an intake bore for communication with a carburetor located on the other side of the piston bore, and an internal passageway cast therein communicating the intake bore and the intake valve cavity. The internal passageway is curved and circumscribes a portion of the intake bore. A walled hollow tube having initially closed ends is embedded in the cast cylinder during casting as a permanently retained casting core. Subsequently the ends of the embedded tube are machined open to communicate with the intake valve cavity and the intake bore, respectively, to define the internal passageway.

6 Claims, 2 Drawing Sheets

METHOD OF MAKING A CAST ENGINE CYLINDER HAVING AN INTERNAL PASSAGEWAY

This is a division of application Ser. No. 339,644, filed Apr. 18, 1989, now U.S. Pat. No. 4,922,863.

BACKGROUND OF THE INVENTION

1. Field of the Invention

The present invention pertains generally to internal combustion engines and more particularly to a cast aluminum alloy cylinder having an internal passageway communicating with one of the valve cavities on one side of the piston bore and with an intake bore on the other side of the piston bore.

2. Description of Related Art

One known configuration of an air-cooled single cylinder internal combustion engine involves a so-called side valve arrangement in which the intake and exhaust valves are located side-by-side relatively close to one another to one side of the piston bore. The valves are oriented parallel to the piston bore and the valve heads and valve seats are located near the top of the cylinder at the interface between the cylinder and the cylinder head. A valve cavity below each of the intake and exhaust valves communicates with the piston bore around the respective valve head (when the valve is open) via a connecting passageway in the cylinder head. The valves are lifted and opened in appropriate sequence by a common camshaft located in the crankcase below the valves.

The disposition of the intake and exhaust valves immediately next to one another on the same side of the cylinder causes layout problems with the associated appurtenances such as the carburetor and muffler. Even where there is sufficient space to accommodate the carburetor and muffler adjacent the intake and exhaust valves, it is not desirable that they be located next to one another because the exhaust heat emitted by the muffler is deleterious to the proper operation of the carburetor. Consequently, an external intake tube is sometimes routed from the intake valve cavity around the cylinder to the carburetor located on the opposite side of the cylinder from the muffler. This solution adds to the cost of the engine by requiring the manufacture and connection of a separate component, namely the external tube.

It would be desirable to cast an intake passageway leading from the intake valve around to the opposite side of the engine integrally with the cylinder. Unfortunately, such a passageway is necessarily curved because the route circumscribes the piston bore, which curvature precludes the use of a removable casting core.

One prior known cast passageway provides a split passageway which is partially provided by a portion cast integrally with the cylinder and partially provided by a bolt-on cover outboard of the cylinder which completes the passageway. This prior passageway has the disadvantage of requiring a precision machined interface surface which must be sealed by a gasket to prevent air leaks into the intake passageway which would upset the air/fuel ratio established by the carburetor.

Another possible solution known in general to the casting art involves the use of a temporary, non-reusable casting core which can be destructively removed after casting. Such cores are typically made of salt or other refractory material which resists the heat of the molten metal from which the cylinder is cast, and which can be removed after casting by mechanical disintegration or by dissolving the salt in water. The cost of such casting techniques is relatively high.

The present invention provides an economical solution to the problem of providing an intake passageway cast integrally with the cylinder.

SUMMARY OF THE INVENTION

The present invention involves a cylinder assembly for an internal combustion engine and a method of making the same, in which a hollow tube initially closed at both ends is cast in place within the cylinder casting so as to provide a passageway from the vicinity of the intake valve, around the piston bore, to the opposite side of the cylinder. After casting, the intake valve cavity is machined so as to cut away one end of the embedded tube and thereby place it in communication with the passageway. An intake bore is machined in the cylinder casting through the wall of the other end of the embedded tube to provide a communication port for connection of the passageway to the carburetor.

The invention provides an integrally cast passageway in the cylinder without requiring the use of a removable or destructible casting core. Instead, a hollow permanently retained casting core is used which can be readily machined open to provide communication to the valve cavity. By utilizing a casting core which is initially a closed hollow body, no special means for sealing or mounting the core are required since molten metal cannot enter the casting core. It is only necessary to hold the core in its desired location within the mold, which can be accomplished simply by way of tabs extending from the casting core which can be clamped in the mold.

The invention, according to one aspect thereof, provides a cast cylinder assembly for an internal combustion engine including a cast cylinder having a piston bore, an intake valve cavity occludable by an intake valve, an intake bore communicating externally of the cast cylinder, and a cast-in-place walled tube embedded in the cast cylinder and defining an internal passageway communicating the intake bore and the intake valve cavity.

It is an object of the present invention to provide an improved cylinder assembly for an internal combustion engine having an integral intake passageway.

It is a further object of the present invention to provide a method for making a cylinder assembly for an internal combustion engine where a passageway is integrally cast in the cylinder for communicating the intake valve area to the side of the cylinder opposite the intake valve.

Further objects and advantages of the present invention will become apparent from the following description.

DESCRIPTION OF THE PREFERRED EMBODIMENT

Figure 1:
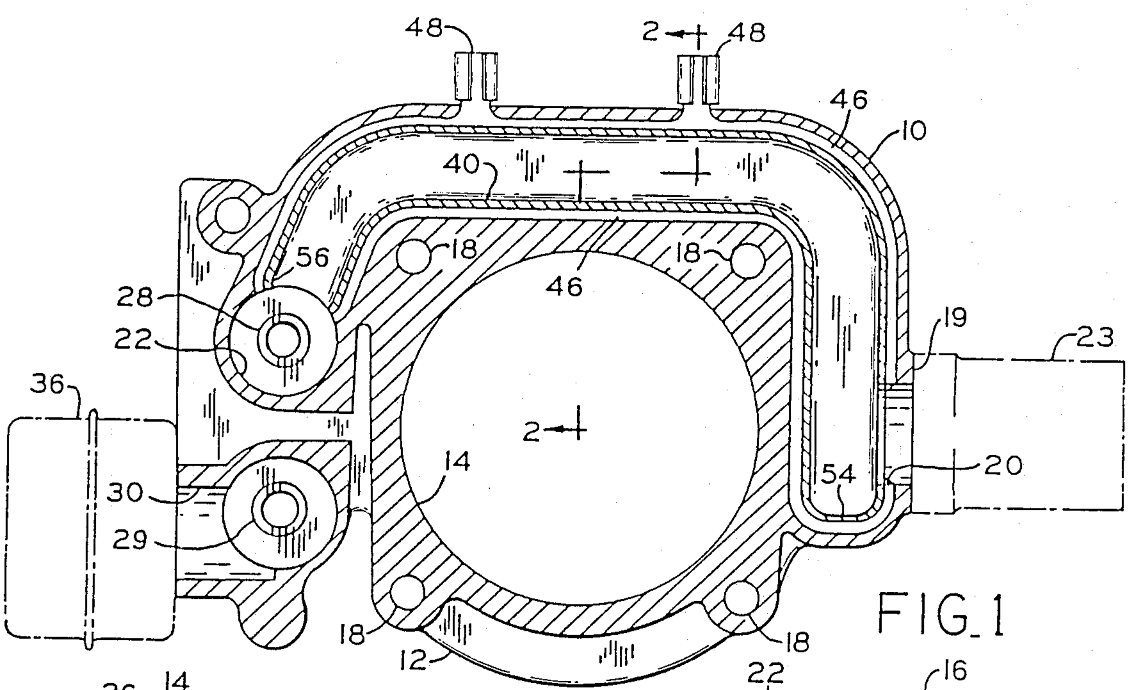
FIG. 1 is a cross-sectional view of the cylinder portion of an air-cooled internal combustion engine in accordance with the present invention, taken along section line 1—1 of FIG. 3 and viewed in the direction of the arrows.

Referring to the drawings, there is illustrated a cylinder 10 of an air-cooled internal combustion engine. Cylinder 10, which is constructed of cast aluminum alloy, includes integral cooling fins 12 which extend therefrom and are oriented transverse to the axis of cylinder 10. A round piston bore 14 is disposed parallel to the axis of cylinder 10, which axis is vertical in the illustrated embodiment. An upper planar gasket surface 16 transverse to the axis of cylinder 10 is machined flat for receiving a cylinder head (not shown) which is retained thereon by bolts (not shown) received in four threaded holes 18. On one side of cylinder 10 is a planar gasket surface 19 disposed in a vertical plane parallel to the axis of cylinder 10 and perpendicular to a radius of piston bore 14. Gasket surface 19 has a round intake bore 20 therein aligned transverse to the axis of cylinder 10 and substantially along a radius of piston bore 14. A pair of threaded holes 22 situated on either side of intake bore 20 are advantageously disposed for receipt of a corresponding pair of bolts (not shown) which serve to retain a hollow intake fitting 23 (shown in chain lines in FIG. 1) to gasket surface 19. Intake fitting 23 communicates with a carburetor (not shown) arranged to deliver a gasoline/air mixture to intake bore 20.

Situated to one side of piston bore 14 generally opposite intake bore 20 are a pair of vertically oriented cup-shaped cavities 22 and 24. Cavity 22 receives therein a vertically reciprocating cam-actuated intake valve (not shown), the head of which seats on annular valve seat 26 at the top of intake cavity 22, and the stem of which is received through annular bushing 28 disposed in cylinder 10 below intake cavity 22. Cavity 24 receives therein a vertically reciprocating cam-actuated exhaust valve (not shown), the head of which seats on an annular valve seat at the top of exhaust cavity 24 in a manner similar to that described above with respect to intake cavity 22, and the stem of which is received through an annular bushing similar to bushing 28 disposed in cylinder 10 below exhaust cavity 24. A horizontal exhaust bore 30 oriented transverse to the axis of cylinder 10 and generally parallel to intake bore 20 communicates exhaust cavity 24 to a planar gasket surface 32 disposed in a vertical plane parallel to the axis of cylinder 10 and to intake gasket surface 19, and situated on the opposite side of cylinder 10 from gasket surface 19. A pair of threaded holes 34 disposed on either side of exhaust bore 30 receive a corresponding pair of bolts (not shown) which serve to retain an exhaust muffler 36 (shown in chain lines in FIG. 1) to gasket surface 32.

Molded integrally with and permanently retained within cylinder 10 is a hollow tubular casting core 40 traversing the perimeter of piston bore 14 and providing communication between intake bore 20 and intake cavity 22. Casting core 40 is constructed in two half-shell parts of stamped sheet steel. An upper part 42 has a generally inverted U-shaped cross-sectional profile. A lower part 44 has a generally U-shaped cross-sectional profile in mirror image to upper part 42. In addition, lower part 44 includes a perimetric lip 46 at the open end of the U-shaped profile which receives the open end of the upper part 42. Upper part 42 and lower part 44 are thereby maintained in alignment with one another when assembled together and are preferably welded together along their perimetric juncture lying substantially in common plane to form a closed, hollow tube. Lower part 44 includes a pair of tabs 48 in spaced relationship along one side of casting core 40 and extending away from piston bore 14 and beyond the aluminum alloy casting of cylinder 10. Each tab 48 includes a pair of upturned wings 50 and 52 which together form a nearly closed tubular protrusion extending outwardly away from piston bore 14 and generally perpendicular to the axis of cylinder 10.

While casting core 40 is illustrated in its preferred embodiment as comprising two half-shell parts of stamped sheet steel, other configurations are possible, including seamless or welded tubes having closed ends.

Figure 2:
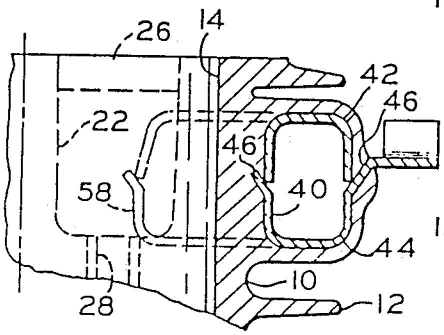
FIG. 2 is a cross-sectional view of the engine cylinder of FIG. 1, taken along section line 2—2 and viewed in the direction of the arrows.
Figure 3:
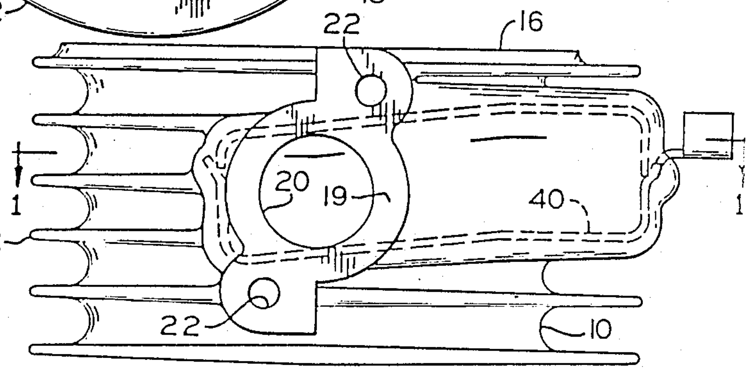
FIG. 3 is a side elevational view of the engine cylinder of FIG. 1 and showing in particular the intake opening.
Figure 4:
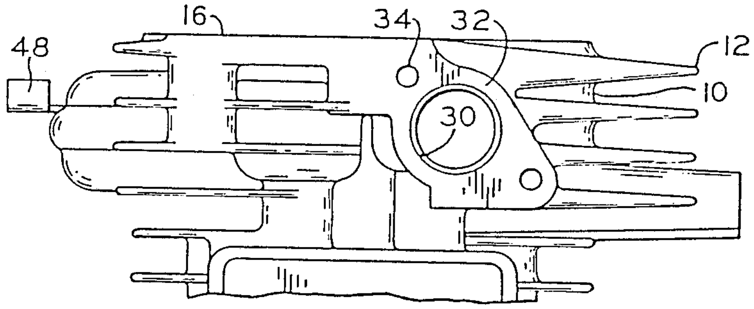
FIG. 4 is a side elevational view of the engine cylinder of FIG. 1 and showing in particular the exhaust opening on the side opposite the intake opening.
Figure 5:
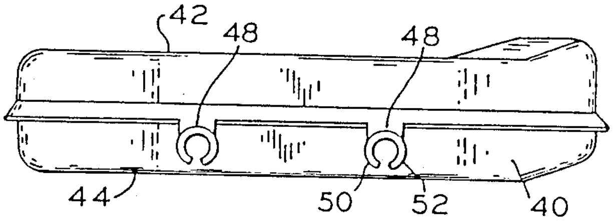
FIG. 5 is a side elevation view of the permanently retained casting core of the engine cylinder of FIG. 1.

As initially molded into cylinder 10, casting core 40 includes a first closed end 54 which extends past intake bore 20 such that core 40 overlies the location of bore 20. Likewise, a second closed end 56 extends within intake cavity 22 as initially molded. Intake bore 20 is subsequently drilled and reamed in cylinder 10 through the wall of core 40, thereby placing core 40 in communication with intake bore 20, and intake cavity 22 is reamed so as to remove the end portion 58 (shown in chain lines in FIG. 2), thereby placing core 40 in communication with intake cavity 22. The aforementioned process of drilling and reaming is described in greater detail below with respect to the method of manufacture of cylinder 10.

Figure 6:
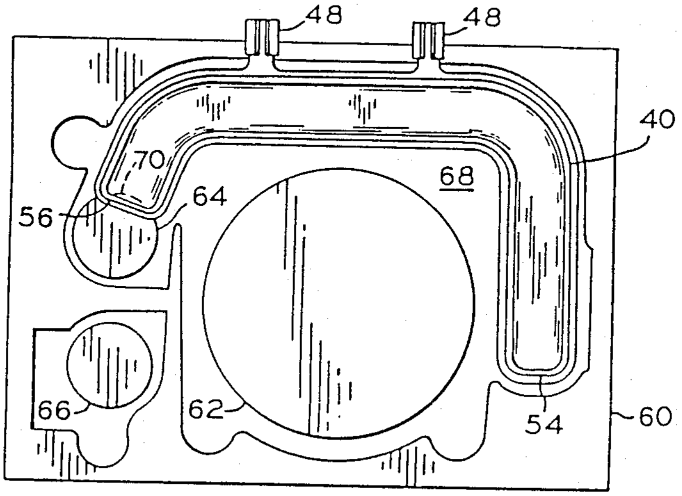
FIG. 6 is a top plan view of a mold useful for die-casting the engine cylinder of FIG. 1, particularly showing the permanently retained casting core mounted therein prior to molding.

Referring in particular to FIGS. 6–9, the method of manufacture of engine cylinder 10 is illustrated. Shown in FIG. 6 is a lower portion of a mold 60 in which engine cylinder 10 is to be die-cast. Mold 60 includes a core 62 which forms the inner wall of piston bore 14, and valve cavity cores 64 and 66 which form the inner walls of intake cavity 22 and exhaust cavity 24, respectively. Cavity 68 in mold 60 receives molten aluminum alloy in accordance with conventional die-casting procedure. Casting core 40 is disposed within cavity 68 and is supported therein prior to casting by an adjacent portion of the die-casting apparatus (not shown) which engages tabs 48. Subsequently, an upper portion of the mold (not shown) is lowered onto mold 60, trapping tabs 48 therebetween and supporting casting core 40 during casting. Core 64 includes an appropriately shaped cut-away portion 70 for accommodating the second closed end 56 of core 40 which protrudes into the space which is to become intake cavity 22. The first end 54 of core 40 is disposed adjacent that surface of mold 60 which is to become gasket surface 19 and intake bore 20 of cylinder 10.

Figure 7:
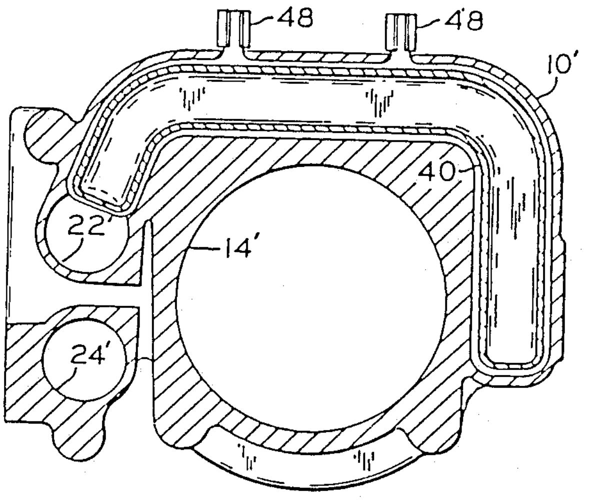
FIG. 7 is a cross-sectional view of an engine cylinder as molded in the mold of FIG. 6, particularly showing the relationship of the permanently retained casting core to the locations of the intake and exhaust openings.

With particular reference to FIG. 7, there is illustrated the casting blank 10' produced in mold 60 of FIG. 6 as it is configured upon removal therefrom. Casting core 40 is embedded within the solidified aluminum of which cylinder blank 10' is comprised, and blank 10' includes rough-cast cavities 14', 22' and 24', which are to become piston bore 14, intake cavity 22 and exhaust cavity 24, respectively.

Figure 8:
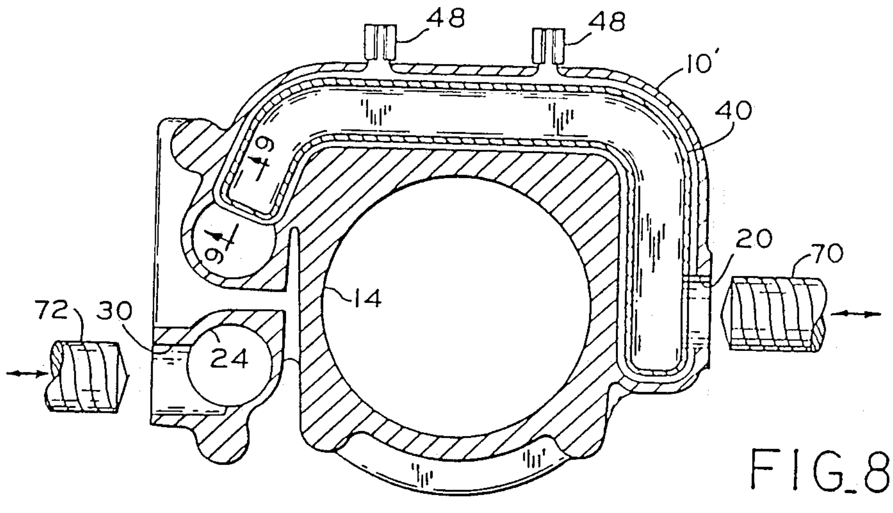
FIG. 8 is a cross-sectional view of the engine cylinder of FIG. 7, and particularly showing the step of reaming the intake and exhaust openings.

As shown in FIG. 8, intake bore 20 is formed through the wall of cylinder blank 10' by a rotary drilling and reaming tool 70 which also cuts through casting core 40 so as to place intake bore 20 in communication with hollow casting core 40. Exhaust bore 30 is similarly formed through the wall of cylinder blank 10' by another rotary drilling and reaming tool 72 so as to communicate with rough-cast exhaust cavity 24'.

Figure 9:
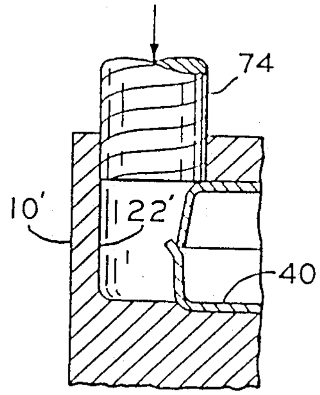
FIG. 9 is a cross-sectional view of the engine cylinder of FIG. 8 taken along section line 9—9, and particularly showing the step of reaming the intake valve opening and communicating the same with the permanently retained casting core.

Referring to FIG. 9, another rotary reaming tool 74 is employed to ream rough-cast cavity 22' to its configuration as intake cavity 22. In the process of reaming, tool 74 cuts away second end portion 56 of casting core 40 flush with the inner wall of intake cavity 22 and thereby places intake cavity 22 in communication with hollow casting core 40.

As a result of the aforementioned method, a cast engine cylinder is produced which has a cast-in-place curved passageway circumscribing a portion of piston bore 14 and communicating intake bore 20 on one side of piston bore 14 with intake valve cavity 22 on the other side of piston bore 14. The core which forms the resulting curved passageway remains in place within the casting, thereby eliminating the need for a destructible salt core.

While the present invention has been particularly described in the context of a preferred embodiment and method, it will be understood that the invention is not limited thereby. For instance, casting processes other than die casting could be utilized, such as those involving a permanent mold, squeeze casting, sand casting, etc. Therefore, it is intended that the scope of the invention include any variations, uses or adaptations of the invention following the general principals thereof and including such departures from the disclosed embodiment and method as come within known or customary practice in the art to which the invention pertains and which fall within the appended claims or the equivalents thereof.

What is claimed is:

1. A method of making a cast cylinder assembly having an internal passageway for an internal combustion engine comprising:

(a) providing a mold suitably shaped for casting a cylinder including an intake valve cavity for an internal combustion engine, the mold including a core cavity for receiving a casting core for forming an internal passageway communicating with the intake valve cavity;

(b) providing a casting core formed as a walled tube having closed ends and a hollow interior in the shape of the internal passageway to be formed;

(c) inserting and holding the casting core in the cavity such that one end thereof is adjacent the intake valve cavity to be cast;

(d) casting molten metal in the mold about the casting core such that the casting core is embedded therein;

(e) removing the cast cylinder with embedded casting core from the mold;

(f) opening the embedded walled tube adjacent one end thereof to place the walled tube in communication with the intake valve cavity; and (g) opening the embedded walled tube adjacent the other end thereof.

2. The method of claim 1, in which the casting core is provided with holding tabs extending therefrom and the holding tabs are held during casting of the cylinder.

3. The method of claim 1, and further including the steps of forming an intake bore in the casting on a side of the piston bore opposite the intake valve cavity.

4. The method of claim 1, in which the casting core inserted into the cavity lies in an orientation which circumscribes a portion of the piston bore.

5. The method of claim 1, in which the walled tube casting core includes a pair of stamped sheet metal half-shells, and including the step of assembling the half-shells together such that they engage one another along a common juncture extending longitudinally of the walled tube prior to insertion of the casting core into the mold cavity.

6. The method of claim 1, and further including the steps of:

drilling an intake bore in the cast cylinder and through the wall of the casting core at one end thereof such that the intake bore is in communication with the interior of the casting core; and drilling through the wall of the casting core at the other end thereof such that the intake valve cavity is in communication with the interior of the casting core.

* * * * *